(12) United States Patent
Takaishi et al.

(10) Patent No.: US 9,696,650 B2
(45) Date of Patent: Jul. 4, 2017

(54) IMAGE FORMING APPARATUS THAT CORRECTS A LIGHT QUANTITY EMITTED FROM CHIPS HAVING LIGHT EMITTING ELEMENTS

(71) Applicant: FUJI XEROX CO., LTD., Tokyo (JP)

(72) Inventors: Shinya Takaishi, Yokohama (JP); Shigeru Arai, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/007,694

(22) Filed: Jan. 27, 2016

(65) Prior Publication Data

US 2017/0045839 A1 Feb. 16, 2017

(30) Foreign Application Priority Data

Aug. 11, 2015 (JP) ................................. 2015-158752
Aug. 11, 2015 (JP) ................................. 2015-158753

(51) Int. Cl.
| | | |
|---|---|---|
| G03G 15/00 | (2006.01) | |
| G03G 15/043 | (2006.01) | |
| H04N 1/29 | (2006.01) | |
| H04N 1/024 | (2006.01) | |

(52) U.S. Cl.
CPC ........ *G03G 15/043* (2013.01); *H04N 1/02409* (2013.01); *H04N 1/29* (2013.01); *H04N 2201/0094* (2013.01)

(58) Field of Classification Search
CPC ..... G03G 15/043; H04N 1/02409; H04N 1/29
USPC ................................................ 399/4; 347/118
See application file for complete search history.

(56) References Cited

U.S. PATENT DOCUMENTS

2015/0205223 A1* 7/2015 Sato ..................... G03G 15/043
347/118

FOREIGN PATENT DOCUMENTS

JP 4403744 B2 1/2010

\* cited by examiner

*Primary Examiner* — Quana M Grainger
(74) *Attorney, Agent, or Firm* — Oliff PLC

(57) ABSTRACT

An image forming apparatus includes an image forming unit in which multiple chips including multiple light emitting elements are arranged in a main scanning direction, the image forming unit forming an image on a recording medium, a reading unit that reads the image fixed on the recording medium by a fixing unit, a density specification unit that specifies a density of a region in the image for each of the chips, the region corresponding to each of the chips, a correction amount specification unit that specifies a correction amount of light quantity from the chip based on an approximate value obtained by approximating the density of a region corresponding to a chip arranged in a predetermined range from a chip for which the correction amount of the light quantity is specified, and a correction unit that corrects the light quantity in accordance with the correction amount.

8 Claims, 10 Drawing Sheets

MAIN SCANNING DIRECTION

| AVERAGE DENSITY Y_B[1] | AVERAGE DENSITY M_G[1] | AVERAGE DENSITY C_R[1] | AVERAGE DENSITY K_G[1] |
|---|---|---|---|
| AVERAGE DENSITY Y_B[2] | AVERAGE DENSITY M_G[2] | AVERAGE DENSITY C_R[2] | AVERAGE DENSITY K_G[2] |
| AVERAGE DENSITY Y_B[3] | AVERAGE DENSITY M_G[3] | AVERAGE DENSITY C_R[3] | AVERAGE DENSITY K_G[3] |
| ⋮ | ⋮ | ⋮ | ⋮ |
| AVERAGE DENSITY Y_B[m] | AVERAGE DENSITY M_G[m] | AVERAGE DENSITY C_R[m] | AVERAGE DENSITY K_G[m] |

FIG. 9

| FILM THICKNESS TH [μm] | Y_ LIGHT QUANTITY SENSITIVITY | M_ LIGHT QUANTITY SENSITIVITY | C_ LIGHT QUANTITY SENSITIVITY | K_ LIGHT QUANTITY SENSITIVITY |
|---|---|---|---|---|
| TH ≥ 31 | ... | ... | ... | ... |
| 31 > TH ≥ 26 | ... | ... | ... | ... |
| 26 > TH ≥ 21 | ... | ... | ... | ... |
| 21 > TH | ... | ... | ... | ... |

IMAGE FORMING APPARATUS THAT CORRECTS A LIGHT QUANTITY EMITTED FROM CHIPS HAVING LIGHT EMITTING ELEMENTS

CROSS-REFERENCE TO RELATED APPLICATIONS

This application is based on and claims priority under USC 119 from Japanese Patent Application No. 2015-158752 filed on Aug. 11, 2015, and Japanese Patent Application No. 2015-158753 filed on Aug. 11, 2015.

BACKGROUND

Technical Field

The present invention relates to an image forming apparatus.

SUMMARY

According to an aspect of the invention, there is provided an image forming apparatus including: an image forming unit in which a plurality of chips including a plurality of light emitting elements are arranged in a main scanning direction, the image forming unit forming an image on a recording medium by developing an electrostatic latent image formed on an image holder, the electrostatic latent image formed on the image holder by exposing the image holder to light from the light emitting elements; a fixing unit that fixes the image formed on the recording medium; a reading unit that reads the image fixed on the recording medium by the fixing unit; a density specification unit that specifies a density of a region in the image read by the reading unit for each of the chips, the region corresponding to each of the chips; a correction amount specification unit that specifies a correction amount of light quantity of light emitted from the chip based on an approximate value obtained by approximating the density specified by the density specification unit, the density of a region corresponding to a chip arranged in a predetermined range from a chip for which the correction amount specification unit specifies the correction amount of the light quantity; and a correction unit that corrects the light quantity of the light emitted from the chip in accordance with the correction amount specified by the correction amount specification unit.

BRIEF DESCRIPTION OF THE DRAWINGS

Exemplary embodiment(s) of the present invention will be described in detail based on the following figures, wherein:

FIG. 9 is a view illustrating an example of a table that stores light quantity sensitivity;

DETAILED DESCRIPTION

[First Embodiment]

An image forming apparatus according to a first embodiment of the invention will be described.

Figure 1:
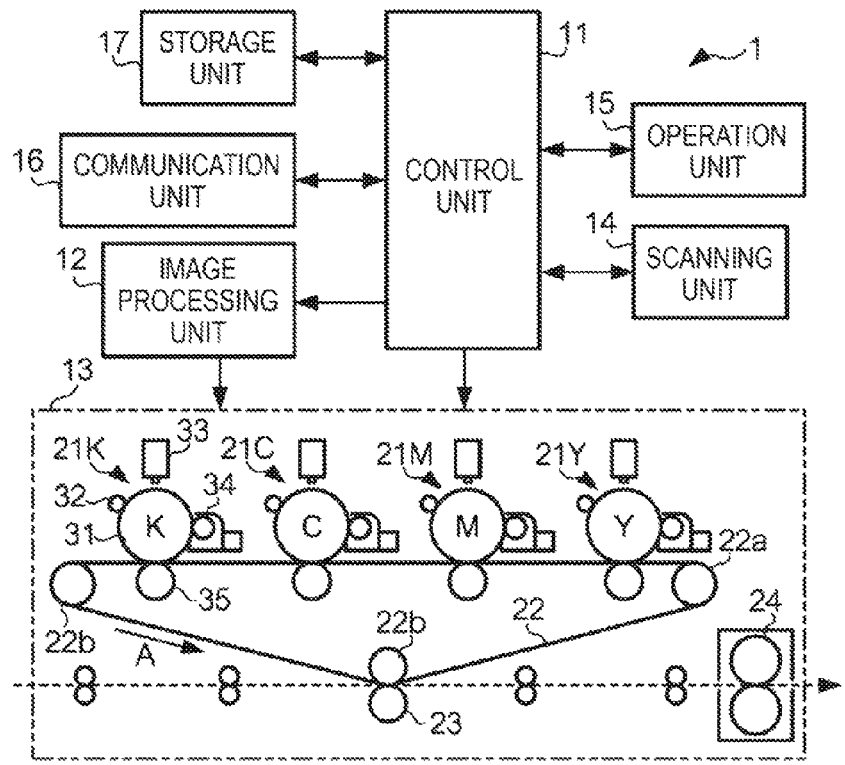
FIG. 1 is a view illustrating a hardware configuration of an image forming apparatus 1 according to a first embodiment of the present invention.

FIG. 1 shows a hardware configuration of an image forming apparatus 1 according to the first embodiment of the invention. The image forming apparatus 1 has a copying function, a facsimile function, a scanning function, and an image forming function that forms an image of image data obtained from an external computer apparatus on a paper sheet.

A control unit 11 includes a central processing unit (CPU), a read only memory (ROM), and a random access memory (RAM). The CPU controls each unit of the image forming apparatus 1 by executing a program that is stored in the ROM. An operation unit 15 is provided with a touch panel or multiple buttons for operating the image forming apparatus 1. A storage unit 17 stores the image data or various types of data that are used for controlling the image forming apparatus 1.

A communication unit 16 is connected to a communication line, and performs data communication with other apparatuses that are connected to the communication line. In addition, examples of the communication line include a telephone line or a local area network (LAN). The communication unit 16 obtains the image data illustrating an image to be formed on a paper sheet from other apparatuses.

A scanning unit 14 optically reads documents, and generates the image data of the images of the read documents. The scanning unit 14 outputs the generated image data to the control unit 11. In the embodiment, the image data is a bitmap format, and each pixel has information on density based on an RGB color model. The scanning unit 14 is an example of a reading unit that reads the image formed on a recording medium.

An image processing unit 12 performs various types of imaging processing to the image data supplied from the control unit 11. The image processing unit 12 performs the imaging processing, such as color correction or gradation correction, to the image of the supplied image data, generates the image data of the images of each color of yellow (Y), magenta (M), cyan (C), black (K), from the image to which the image processing is performed, and outputs the generated image data to the image forming unit 13.

An image forming unit 13 is an example of the image forming unit that forms the image on the paper sheet (recording medium) by an electro-photographic method, in accordance with the image data of the supplied YMCK. The image forming unit 13 includes image forming engines 21Y, 21M, 21C, and 21K, an intermediate transfer belt 22, a secondary transfer roller 23, and a fixer 24. Each of the image forming engines 21Y, 21M, 21C, and 21K includes a photosensitive drum 31, a charger 32, an exposure device 33, a developer 34, and a primary transfer roller 35. The image forming engine 21Y forms a yellow toner image in accordance with the supplied yellow image data, the image forming engine 21M forms a magenta toner image in accordance with the supplied magenta image data, the image forming engine 21C forms a cyan toner image in accordance with the supplied cyan image data, and the image forming engine 21K forms a black toner image in accordance with the supplied black image data.

When distinguishing the photosensitive drum 31, the charger 32, the exposure device 33, the developer 34, and the primary transfer roller 35 of each image forming engine, reference numerals of the image forming engines will be attached to the end of each member. For example, the exposure device 33 of the image forming engine 21Y is expressed as the exposure device 33Y.

The photosensitive drum 31 that is an example of an image holder has a photosensitive layer formed on a front surface thereof, and rotates around a shaft. The charger 32 charges the front surface of the photosensitive drum 31 to predetermined potential.

The exposure device 33 includes an LPH and a driving circuit 330 that drives a light emitting element provided in the LPH. The LPH according to the invention is provided with multiple chips in which multiple light emitting elements (LEDs in the embodiment) are arranged in line. In addition, the LPH is provided with a lens array for imaging light emitted from the light emitting element on the photosensitive drum 31. In the LPH, the multiple chips are disposed to be aligned along a main scanning direction.

Figure 2:
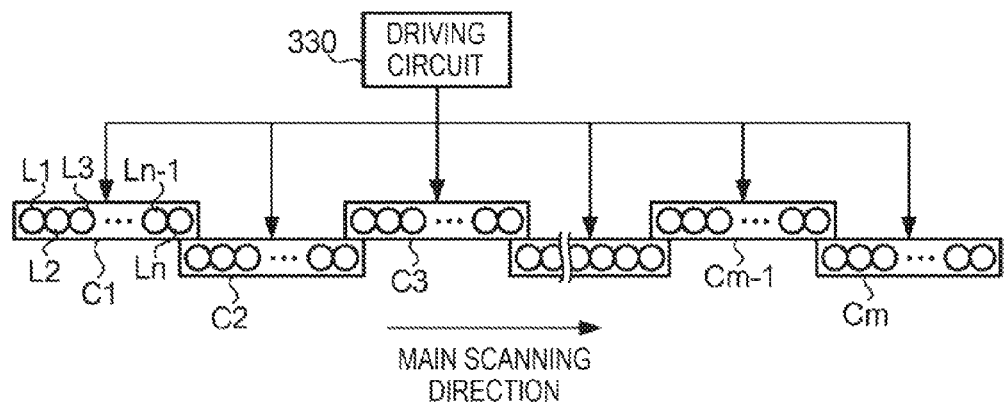
FIG. 2 is a view illustrating an example of an arrangement of chips in an LPH.

FIG. 2 shows an arrangement of the chips in the LPH. In the LPH, m chips C1 to Cm are arranged in a direction (main scanning direction) horizontal to the shaft direction of the photosensitive drum 31. In addition, in each of the chips C1 to Cm, n light emitting elements L1 to Ln that irradiate the photosensitive drum 31 with the light are arranged in the shaft direction (main scanning direction) of the photosensitive drum 31. In the following description, when it is not necessary to distinguish each of the chips C1 to Cm, the chips are referred to as a "chip C" for convenience of description. Similarly, when it is not necessary to distinguish each of the light emitting elements L1 to Ln, the light emitting elements are referred to as a "light emitting element L" for convenience. In addition, a chip C that is even-numbered from a starting point of the main scanning direction is referred to as an even-numbered chip, and a chip C that is odd-numbered from the starting point of the main scanning direction is referred to as an odd-numbered chip.

The exposure device 33 forms an electrostatic latent image on the photosensitive drum 31 by exposing the front surface of the photosensitive drum 31, by irradiating the charged photosensitive drum 31 with the light from the light emitting element L in accordance with the supplied image data. The developer 34 develops the electrostatic latent image formed on the photosensitive drum 31, and forms a toner image. The primary transfer roller 35 transfers the toner image formed on the photosensitive drum 31 to the intermediate transfer belt 22.

The intermediate transfer belt 22 is supported by a driving roller 22a and a back-up roller 22b, and is rotated in a direction of an arrow A in the drawing by the driving roller 22a. The intermediate transfer belt 22 transports the toner image transferred from the photosensitive drum 31 of the image forming engines 21Y, 21M, 21C, and 21K, to the secondary transfer roller 23. The secondary transfer roller 23 transfers the toner image formed on the intermediate transfer belt 22 to the recording medium, such as the paper sheet. The recording medium to which the toner image is transferred is transported to the fixer 24. The fixer 24 fixes the toner image on the recording medium by heating or pressurizing. The fixer 24 is an example of a fixing unit that fixes the image on the recording medium. The recording medium on which the toner image is fixed is discharged from the image forming apparatus 1.

Figure 3:
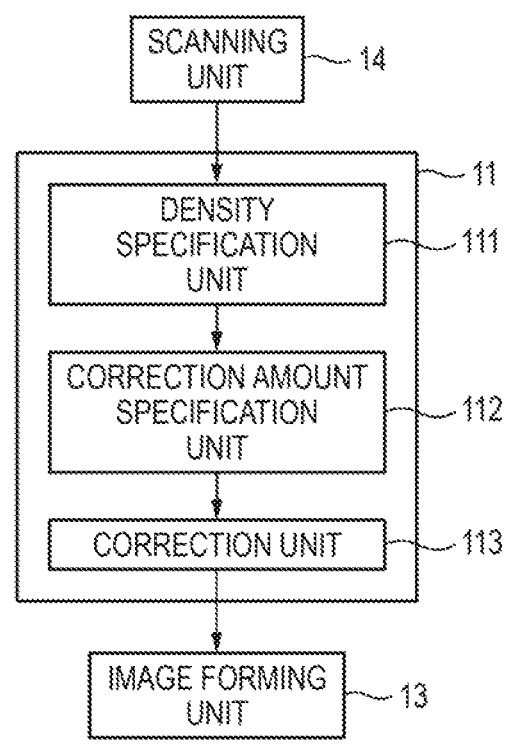
FIG. 3 is a functional block diagram of a control unit 11 of the image forming apparatus 1 according to a first embodiment of the invention.

FIG. 3 is a functional block diagram of functions realized as the CPU of the control unit 11 executes the program. A density specification unit 111 specifies density of regions that correspond to the chips C1 to Cm for each of the chips C1 to Cm in the image of the image data generated by the scanning unit 14. A correction amount specification unit 112 specifies a correction amount of a light quantity of the light generated by the chips C1 to Cm in accordance with the density specified by the density specification unit 111 or a state of the image forming unit 13. A correction unit 113 controls the driving circuit in accordance with the correction amount specified by the correction amount specification unit 112, and corrects the light quantity of the light emitted by the chips C1 to Cm.

(Operation Example of First Embodiment)

Figure 4:
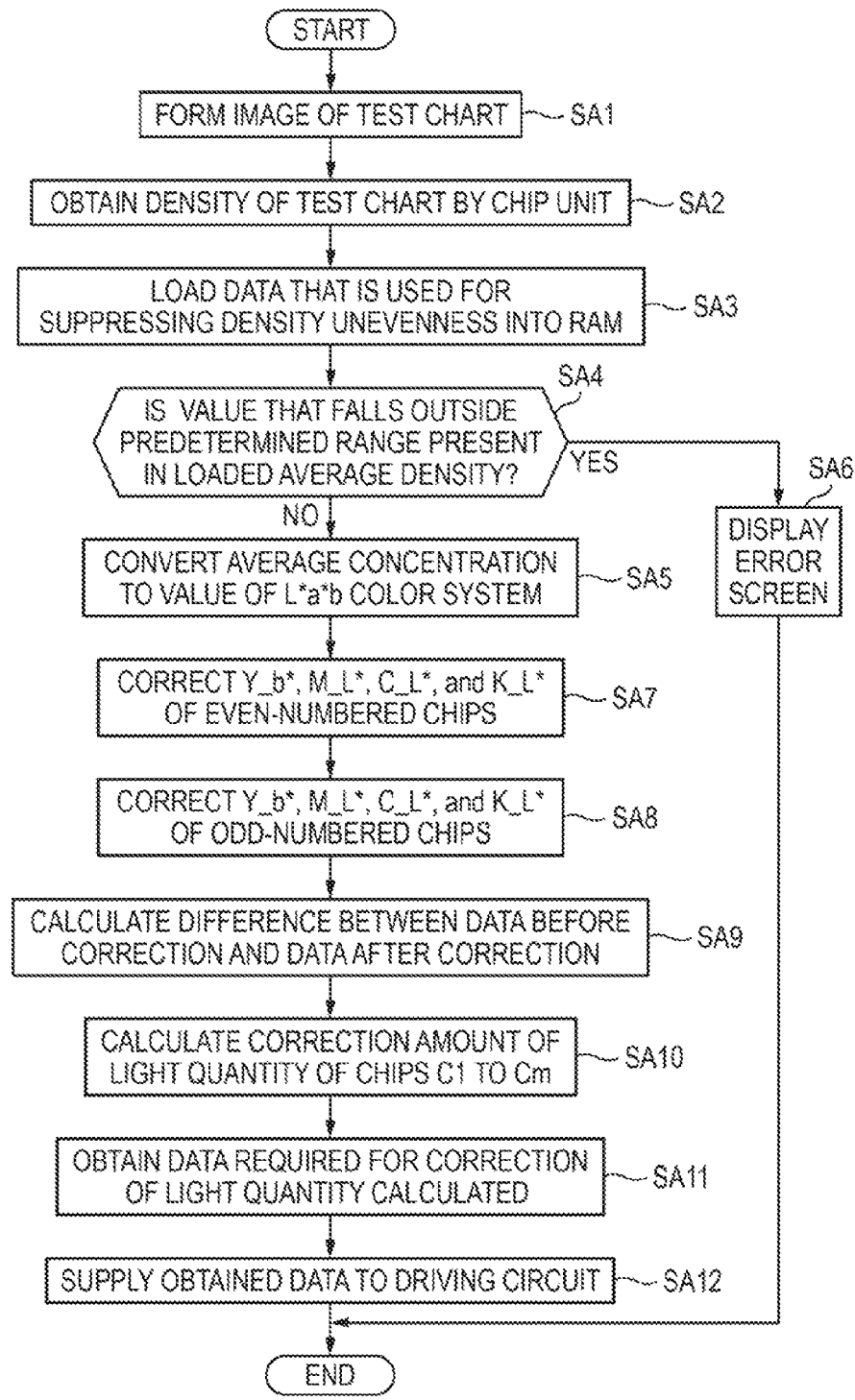
FIG. 4 is a flowchart illustrating a flow of processing performed by the control unit 11.

FIG. 4 is a flowchart illustrating a flow of processing performed by the control unit 11 for suppressing the density unevenness of the image formed on the paper sheet. An example of the operation performed by the image forming apparatus 1 for suppressing the density unevenness of the image formed on the paper sheet will be described in reference to FIG. 4.

First, when a user of the image forming apparatus 1 performs an operation of indicating the correction of the density unevenness of the toner image in the operation unit 15, the control unit 11 forms an image of test chart on the paper sheet by controlling each unit (step SA1). Specifically, the control unit 11 supplies the image data of the test chart determined in advance to the image processing unit 12. The image processing unit 12 generates the image data of each color of Y, M, C, and K, in accordance with the supplied image data. The image processing unit 12 supplies the image data of Y to the image forming engine 21Y, and supplies the image data of M to the image forming engine 21M. In addition, the image processing unit 12 supplies the image data of C to the image forming engine 21C, and supplies the image data of K to the image forming engine 21K. When the image data is supplied to the image forming engine 21Y, the image forming engine 21M, the image forming engine 21C, and the image forming engine 21K, the image forming unit 13 transfers the toner image that corresponds to the supplied image to the paper sheet, fixes the toner image on the paper sheet, and discharges the paper sheet on which the toner image is fixed from the image forming apparatus 1.

Figure 5:
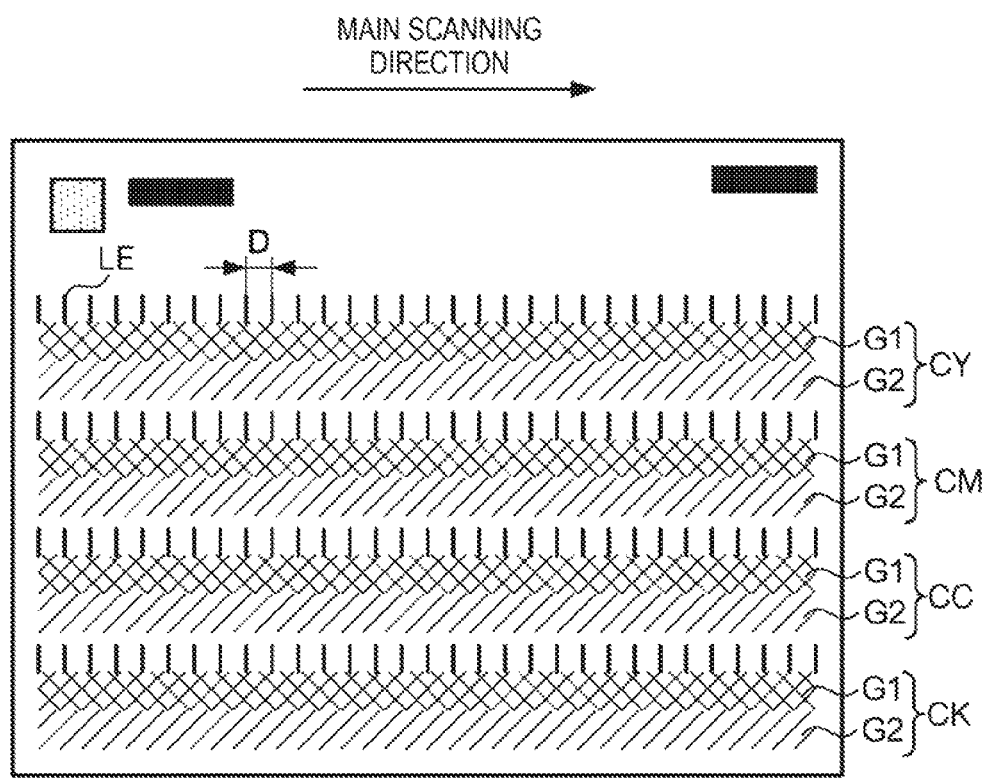
FIG. 5 is a view illustrating an example of a test chart that is formed on a paper sheet by the image forming apparatus 1.

FIG. 5 shows an example of the test chart that is formed on the paper sheet by the image forming apparatus 1. The test chart has a test image CY, a test image CM, a test image CC, and a test image CK. The test image CY is an image formed only by yellow toner, and the test image CM is an image formed only by magenta toner. In addition, the test image CC is an image formed only by cyan toner, and the test image CK is an image formed only by black toner.

Each test image has a rectangular image G1 that is formed based on a first density determined in advance, and a rectangular image G2 that is formed based on a second density determined in advance. In the embodiment, the first density is higher than the second density. In addition, each test image has multiple lines LE. A distance D between adjacent lines LE, expresses the width of the image obtained by the exposure of one chip C. For example, a distance between a line LE at a left end in the main scanning direction of FIG. 5 and a line LE that is adjacent to the line LE at the left end in the main scanning direction of FIG. 5 corresponds to the width of the image obtained by the exposure of the chip C1.

When the paper sheet on which the test chart is formed is discharged from the image forming apparatus 1, the user of the image forming apparatus 1 sets the discharged paper sheet on which the test chart is formed on the scanning unit 14, and operate the operation unit 15 to give instructions of reading of the test chart. In response to this operation, the control unit 11 reads the test chart by controlling the scanning unit 14, and obtains the density of the test chart by the chip C unit (step SA2)

Figure 6:
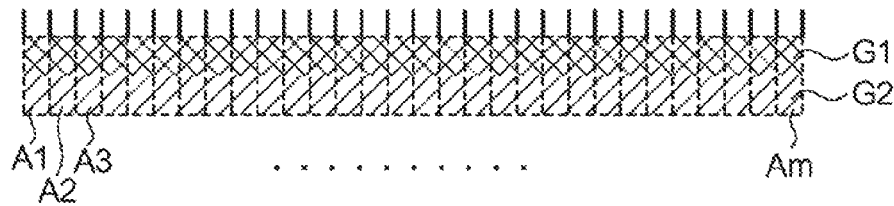
FIG. 6 is a view illustrating regions that correspond to chips C1 to Cm in a test image.

Specifically, when the scanning unit 14 reads the test chart, the image data of the read test chart is supplied to the control unit 11. The image data is in bitmap format, and each pixel has information on the density based on the RGB color model. Here, as illustrated in FIG. 6, regions A1 to Am illustrated by dotted lines are images obtained by the exposure by the chips C1 to Cm. When the image data is supplied, the control unit 11 (density specification unit 111) calculates the density of each test image by the chip C unit. For example, the control unit 11 calculates an average value of the density of R (red), an average value of the density of G (green), and an average value of the density of B (blue), in the region A1 that corresponds to the chip C1. In addition, the control unit 11 also calculates an average value of the density of each color of RGB in the regions A2 to Am of the test image CY. In addition, the control unit 11 also calculates an average value of the density of each color of RGB in the regions A1 to Am, with respect to the test image CM, the test image CC, and the test image CK.

Figures 7, 8:
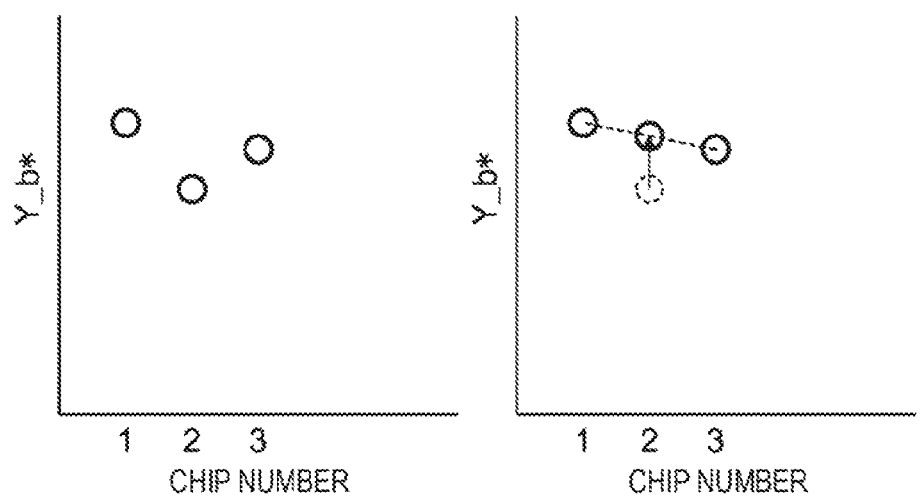
FIG. 7 is a view illustrating an example of data loaded into a RAM.
FIG. 8 is a view illustrating an operation of correction.

Next, the control unit 11 (density specification unit 111) loads the data that is used for suppressing the density unevenness of the image formed on the paper sheet into the RAM (step SA3). FIG. 7 is a view illustrating an example of data loaded into the RAM by the processing of step SA3. Specifically, the control unit 11 loads the average density of B (blue) of the regions A1 to Am among the average densities of each color of RGB obtained from the regions A1 to Am of the test image CY, as average densities Y_B[1] to Y_B[m] in the RAM. In addition, the control unit 11 loads the average density of G (green) of the regions A1 to Am among the average densities of each color of RGB obtained from the regions A1 to Am of the test image CM, as average densities M_G[1] to M_G[m] into the RAM. In addition, the control unit 11 loads the average density of R (red) of the regions A1 to Am among the average densities of each color of RGB obtained from the regions A1 to Am of the test image CC, as average densities C_R[1] to C_R[m] into the RAM. In addition, the control unit 11 loads the average density of G (green) of the regions A1 to Am among the average densities of each color of RGB obtained from the regions A1 to Am of the test image CK, as average densities K_G[1] to K_G[m] into the RAM.

When finishing the processing of step SA3, the control unit 11 (density specification unit 111) determines whether or not a value that falls outside a range predetermined in the average density loaded into the RAM is present (step SA4). For example, a dust image may be included in the image data generated by the scanning unit 14 when dust adheres onto the read test chart or when dust adheres to the scanning unit 14. In this case, in a part where the dust image is present, the density becomes larger than that in other parts, and the average density falls outside the predetermined range. If a value that falls outside the predetermined range in the average density loaded into the RAM is present (YES in step SA4), the control unit 11 controls the operation unit 15 so that an error screen that notifies that there is an abnormality in the scanning result of the test chart is displayed on a touch panel of the operation unit 15 (step SA6).

Meanwhile, the control unit 11 (density specification unit 111) converts the value of the average density to a value of the color model of L*a*b* (step SA5) if a value that falls outside the predetermined range in the average density loaded into the RAM is not present (NO in step SA4). Here, the control unit 11 converts the value of the average densities Y_B[1] to Y_B[m] to a value of b*, and stores the obtained value of b* as Y_b*[1] to Y_b*[m]. In addition, the control unit 11 converts the value of the average densities M_G[1] to M_G[m] to a value of L*, and stores the obtained value of L* as M_L*[1] to M_L*[m]. In addition, the control unit 11 converts the value of the average densities C_R[1] to C_R[m] to a value of L*, and stores the obtained value of L* as C_L*[1] to C_L*[m]. In addition, the control unit 11 converts the value of the average densities K_G[1] to K_G[m] to a value of L*, and stores the obtained value of L* as K_L*[1] to K_L*[m]. As a method of converting the value of the average density to the value of the color model of L*a*b*, for example, a conversion table that converts the density value of the RGB color model to the value of the color system of L*a*b* is stored in the storage unit 17, and converts the value by using the conversion table.

When finishing the processing of step SA5, the control unit 11 (correction amount specification unit 112) corrects the values of Y_b*, M_L*, C_L*, and K_L* related to the even-numbered chips (step SA7).

Specifically, first, the values of Y_b*[1] to Y_b*[m], M_L*[1] to M_L*[m], C_L*[1] to C_L*[m], and K_L*[1] to K_L*[m] related to the chips C1 to Cm are copied to the RAM as the Y_b*[1] to Y_b*[m] before the correction, M_L*[1] to M_L*[m] before the correction, C_L*[1] to C_L*[m] before the correction, and K_L*[1] to K_L*[m] before the correction. Next, the control unit 11 corrects values of Y_b*, M_L*, C_L*, and K_L* related to the even-numbered chips by using the following formulas (1) to (4).

$$Y\_b^*[i]=(Y\_b^*[i+1]-Y\_b^*[i-1])\div 2+Y\_b^*[i-1] \quad (1)$$

$$M\_L^*[i]=(M\_L^*[i+1]-M\_L^*[i-1])\div 2+M\_L^*[i-1] \quad (2)$$

$$C\_L^*[i]=(C\_L^*[i+1]-C\_L^*[i-1])\div 2+C\_L^*[i-1] \quad (3)$$

$$K\_L^*[i]=(K\_L^*[i+1]-K\_L^*[i-1])\div 2+K\_L^*[i-1] \quad (4)$$

In step SA7, the control unit 11 sets an initial value of i as 2, increases the value of i by increments of 2, and finishes the correction related to the even-numbered chip when the value of i exceeds m−2. FIG. 8 is a view illustrating an operation of correction in step SA7. For example, in a case where the value of Y_b*[2] related to the chip C2 has a relationship illustrated on a left side of FIG. 8 with respect to Y_b*[1] related to the chip C1 and the Y_b*[3] related to the chip C3, when correcting the value of Y_b*[2] related to the chip C2 by the formula (1), as illustrated on a right side of FIG. 8, Y_b*[2] of the chip C2 is corrected to the average value of Y_b*[1] of the chip C1 and Y_b*[3] of the chip C3.

When finishing the processing of step SA7, control unit 11 (correction amount specification unit 112) corrects the values of Y_b*, M_L*, C_L*, and K_L* related to the odd-numbered chips (step SA8). Specifically, in the above-described formulas (1) to (4), the control unit 11 sets the initial value of i as 3, increases the value of i by increments of 2, and finishes the correction related to the odd-numbered chips when the value of i exceeds m that is the number of chips C.

When finishing the processing of step SA7 and step SA8, a difference between the values of Y_b*, M_L*, C_L*, and K_L* related to each chip C and the values of Y_b*, M_L*, C_L*, and K_L* related to the adjacent chips C in the main scanning direction, is corrected to be small.

When finishing the processing of step SA8, the control unit 11 (correction amount specification unit 112) calculates a difference between the values of Y_b*[1] to Y_b*[m], M_L*[1] to M_L*[m], C_L*[1] to C_L*[m], and K_L*[1] to K_L*[m] after the correction and the values of Y_b*[1] to Y_b*[m] before the correction, M_L*[1] to M_L*[m] before the correction, C_L*[1] to C_L*[m] before the correction, and K_L*[1] to K_L*[m] before the correction (step SA9). Specifically, the control unit 11 acquires the difference between Y_b*[1] to Y_b*[m] after the correction and Y_b*[1] to Y_b*[m] before the correction, and stores the acquired difference as ΔY_b*[1] to ΔY_b*[m] in the RAM. In addition, the control unit 11 acquires the difference between M_L*[1] to M_L*[m] after the correction and M_L*[1] to M_L*[m] before the correction, and stores the acquired difference as ΔM_L*[1] to ΔM_L*[m] in the RAM. In addition, the control unit 11 acquires the difference between C_L*[1] to C_L*[m] after the correction and C_L*[1] to C_L*[m] before the correction, and stores the acquired difference as ΔC_L*[1] to ΔC_L*[m] in the RAM. In addition, the control unit 11 acquires the difference between K_L*[1] to K_L*[m] after the correction and K_L*[1] to K_L*[m] before the correction, and stores the acquired difference as ΔK_L*[1] to ΔK_L*[m] in the RAM. For example, the control unit 11 stores the difference between Y_b*[1] after the correction and Y_b*[1] before the correction as ΔY_b*[1] in the RAM.

When finishing the processing of step SA9, the control unit 11 (correction amount specification unit 112) calculates the correction amount of the light quantity of the light output by the chips C1 to Cm of the exposure device 33 (step SA10).

Specifically, Y_Δlight quantities[1] to [m] that express the correction amount of the light quantity of the light output by the chips C1 to Cm of the exposure device 33Y, is calculated by using a formula (5).

$$Y\_\Delta\text{light quantity}[i] = (\Delta Y\_b^*[i] \div Y\_\text{light quantity sensitivity}) \times (Y\_\text{light quantity gain} \div 100) \qquad (5)$$

The control unit 11 the initial value of i as 1, increases the value of i by increments of 1, and finishes the calculation of Y_Δlight quantity [i] when the value of i exceeds m.

Here, the Y_light quantity gain is a coefficient determined in advance with respect to the exposure device 33Y, and is stored in the storage unit 17. In addition, the Y_light quantity sensitivity is a coefficient that corresponds to light sensitivity of a photosensitive drum 31Y, and is stored in the storage unit 17. The Y_light quantity sensitivity expresses how much the value of b* of yellow changes when changing the light quantity only by an amount (for example, 1% of the light quantity that can be output) determined in advance. In addition, the light sensitivity of the photosensitive drum 31 changes in accordance with a film thickness of the photosensitive drum 31. For this reason, in the embodiment, as illustrated in FIG. 9, a table that stores the Y_light quantity sensitivity in accordance with the film thickness of the photosensitive drum 31Y is stored in the storage unit 17, and the control unit 11 performs calculation of Y_Δlight quantity [i] by obtaining the Y_light quantity sensitivity that corresponds to the film thickness of the photosensitive drum 31Y, from the table.

In other words, the control unit 11 selects a method that corresponds to a state of the film thickness and includes a plurality of methods as a specification method of Y_Δlight quantity [i] in accordance with the film thickness (a state of image forming process) of the photosensitive drum 31Y, and performs specification of Y_Δlight quantity [i] by the selected method.

In addition, the control unit 11 calculates M_Δlight quantities[1] to [m] that expresses the correction amount of the light quantity of the light output by the chips C1 to Cm of an exposure device 33M by using a formula (6).

$$M\_\Delta\text{light quantity}[i] = (\Delta M\_L^*[i] \div M\_\text{light quantity sensitivity}) \times (M\_\text{light quantity gain} \div 100) \qquad (6)$$

The control unit 11 sets the initial value of i as 1, increases the value of i by increments of 1, and finishes the calculation of M_Δlight quantity [i] when the value of i exceeds m.

Here, the M_light quantity gain is a coefficient determined in advance with respect to the exposure device 33M, and is stored in the storage unit 17. In addition, the M_light quantity sensitivity is a coefficient that corresponds to light sensitivity of a photosensitive drum 31M, and is stored in the storage unit 17. The M_light quantity sensitivity expresses how much the value of L* of magenta changes when changing the light quantity only by an amount (for example, 1% of the light quantity that can be output) determined in advance. As illustrated in FIG. 9, the value of the M_light quantity sensitivity that corresponds to the film thickness of the photosensitive drum 31M is also stored in the table similar to the Y_light quantity sensitivity, and the control unit 11 performs the calculation of M_Δlight quantity [i] by obtaining the M_light quantity sensitivity that corresponds to the film thickness of the photosensitive drum 31M, from the table.

In other words, the control unit 11 selects a method that corresponds to a state of the film thickness and includes a plurality of methods as a specification method of M_Δlight quantity [i] in accordance with the film thickness (a state of image forming process) of the photosensitive drum 31M, and performs specification of M_Δlight quantity [i] by the selected method.

In addition, the control unit 11 calculates C_Δlight quantities[1] to [m] that expresses the correction amount of the light quantity of the light output by the chips C1 to Cm of an exposure device 33C by using a formula (7).

$$C\_\Delta\text{light quantity}[i] = (\Delta C\_L^*[i] \div C\_\text{light quantity sensitivity}) \times (C\_\text{light quantity gain} \div 100) \qquad (7)$$

The control unit 11 sets the initial value of i, increases the value of i by increments of 1, and finishes the calculation of C_Δlight quantity [i] when the value of i exceeds m.

Here, the C_light quantity gain is a coefficient determined in advance with respect to the exposure device 33C, and is stored in the storage unit 17. In addition, the C_light quantity sensitivity is a coefficient that corresponds to light sensitivity of a photosensitive drum 31C, and is stored in the storage unit 17. The C_light quantity sensitivity expresses how much the value of L* of cyan changes when changing the light quantity only by an amount (for example, 1%) determined in advance. As illustrated in FIG. 9, the value of the C_light quantity sensitivity that corresponds to the film thickness of the photosensitive drum 31C is also stored in the table similar to the Y_light quantity sensitivity, and the control unit 11 performs the calculation of C_Δlight quantity [i] by obtaining the C_light quantity sensitivity that corresponds to the film thickness of the photosensitive drum 31C, from the table.

In other words, the control unit 11 selects a method that corresponds to a state of the film thickness and includes plural methods as a specification method of C_Δlight quantity [i] in accordance with the film thickness (a state of image forming process) of the photosensitive drum 31C, and performs specification of C_Δlight quantity [i] by the selected method.

In addition, the control unit 11 calculates K_Δlight quantities[1] to [m] that expresses the correction amount of the light quantity of the light output by the chips C1 to Cm of an exposure device 33K by using a formula (8).

$$K\_\Delta light\ quantity[i]=(\Delta K\_L^*[i]\div K\_light\ quantity\ sensitivity)\times(K\_light\ quantity\ gain\div 100) \quad (8)$$

The control unit 11 sets the initial value of i as 1, increases the value of i by increments of 1, and finishes the calculation of K_Δlight quantity [i] when the value of i exceeds m.

Here, the K_light quantity gain is a coefficient determined in advance with respect to the exposure device 33K, and is stored in the storage unit 17. In addition, the K_light quantity sensitivity is a coefficient that corresponds to light sensitivity of a photosensitive drum 31K, and is stored in the storage unit 17. The K_light quantity sensitivity expresses how much the value of L* of black changes when changing the light quantity only by an amount (for example, 1% of the light quantity that can be output) determined in advance. As illustrated in FIG. 9, the value of the K_light quantity sensitivity that corresponds to the film thickness of the photosensitive drum 31K is also stored in the table similar to the Y_light quantity sensitivity, and the control unit 11 performs the calculation of K_Δlight quantity [i] by obtaining the K_light quantity sensitivity that corresponds to the film thickness of the photosensitive drum 31K, from the table.

In other words, the control unit 11 selects a method that corresponds to a state of the film thickness and includes a plurality of methods as a specification method of K_Δlight quantity [i] in accordance with the film thickness (a state of image forming process) of the photosensitive drum 31K, and performs specification of K_Δlight quantity [i] by the selected method.

When finishing the processing of step SA10, the control unit 11 (correction unit 113) obtains the data supplied to the driving circuit 330 for changing the light quantities of the chips C1 to Cm only by the correction amount calculated in step SA10 (step SA11).

Specifically, in the storage unit 17, the tables that associate the correction amount of the light quantity and the data supplied to the driving circuit 330 for changing the light quantity only by the correction amount with each other is stored. The control unit 11 obtains the corresponding data from the table for each calculated Y_Δlight quantities[1] to [m] and considers the data as correction data Ydata[1] to [m]. In addition, the control unit 11 obtains the corresponding data from the table for each calculated M_Δlight quantities[1] to [m] and considers the data as correction data Mdata[1] to [m]. In addition, the control unit 11 obtains the corresponding data from the table for each calculated C_Δlight quantities[1] to [m] and considers the data as correction data Cdata[1] to [m]. In addition, the control unit 11 obtains the corresponding data from the table for each calculated K_Δlight quantities[1] to [m] and considers the data as correction data Kdata[1] to [m]. In other words, the control unit 11 obtains the correction data for correcting the light quantity with respect to each of the chips C1 to Cm of the exposure device 33Y, the exposure device 33M, the exposure device 33C, and the exposure device 33K.

When finishing the processing of step SA11, the control unit 11 (correction unit 113) supplies the correction data obtained in step SA11 to the driving circuit 330 of the exposure device 33 (step SA12). Specifically, the control unit 11 supplies the correction data Ydata[1] to [m] to a driving circuit 330Y, and supplies the correction data Mdata[1] to [m] to a driving circuit 330M. In addition, the control unit 11 supplies the correction data Cdata[1] to [m] to a driving circuit 330C, and supplies the correction data Kdata[1] to [m] to a driving circuit 330K. Each driving circuit 330 drives the chips C1 to Cm in accordance with the supplied correction data, and controls the light quantity of the light output by the chips C1 to Cm. For example, the driving circuit 330Y controls the chip C2 based on the correction data Ydata[2]. Accordingly, the light quantity of the chip C2 changes only by Y_Δlight quantity [2].

[Second Embodiment]

Next, an image forming apparatus according to a second embodiment of the present invention will be described. The image forming apparatus according to the second embodiment is different from the image forming apparatus according to the first embodiment in that a control unit 51 is provided instead of the control unit 11 of the first embodiment. Parts that are the same with or equivalent to those of the first embodiment are given the same or corresponding reference numerals and the description thereof will be simplified or omitted.

Figure 10:
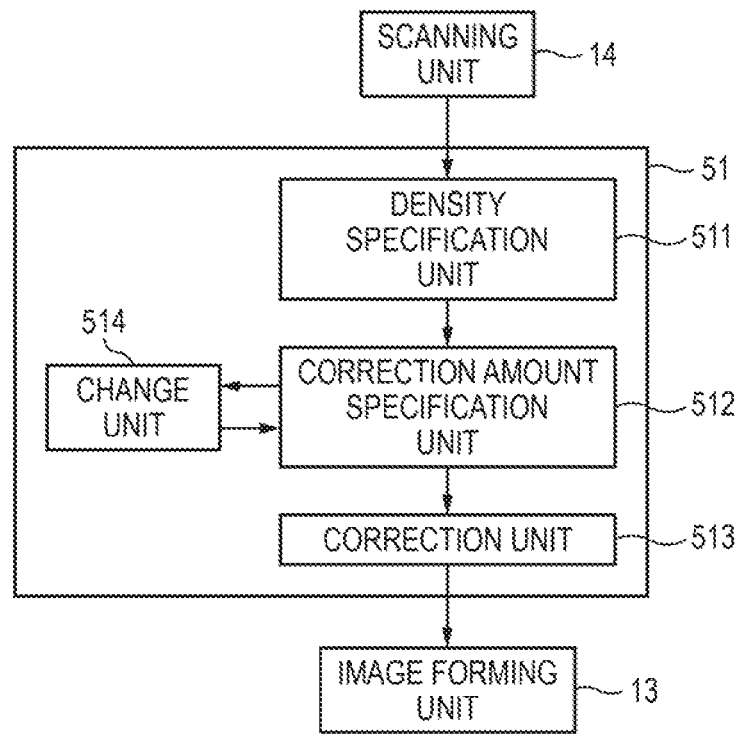
FIG. 10 is a functional block diagram of a control unit 51 of an image forming apparatus according to a second embodiment of the present invention.

FIG. 10 shows a functional block diagram of functions realized by executing the program by the CPU of the control unit 51.

A density specification unit 511 specifies the density of the regions that correspond to the chips C1 to Cm, for each of the chips C1 to Cm, in the image of the image data generated by the scanning unit 14.

A correction amount specification unit 512 specifies the correction amount of the light quantity of the light emitted from the chips C1 to Cm in accordance with the density specified by the density specification unit 511 and a state of the image forming unit 13. The correction amount specification unit 512 adjusts the correction amount by using a Y_light quantity gain, an M_light quantity gain, a C_light quantity gain, and a K_light quantity gain in specifying the correction amount, which will be described later.

A correction unit 513 controls the driving circuit in accordance with the correction amount specified by the correction amount specification unit 512, and corrects the light quantity of the light generated by the chips C1 to Cm.

A change unit 514 changes the Y_light quantity gain, the M_light quantity gain, the C_light quantity gain, and the K_light quantity gain, based on the density currently specified and the density previously specified by the density specification unit 511.

(Operation Example of Second Embodiment)

Figure 11:
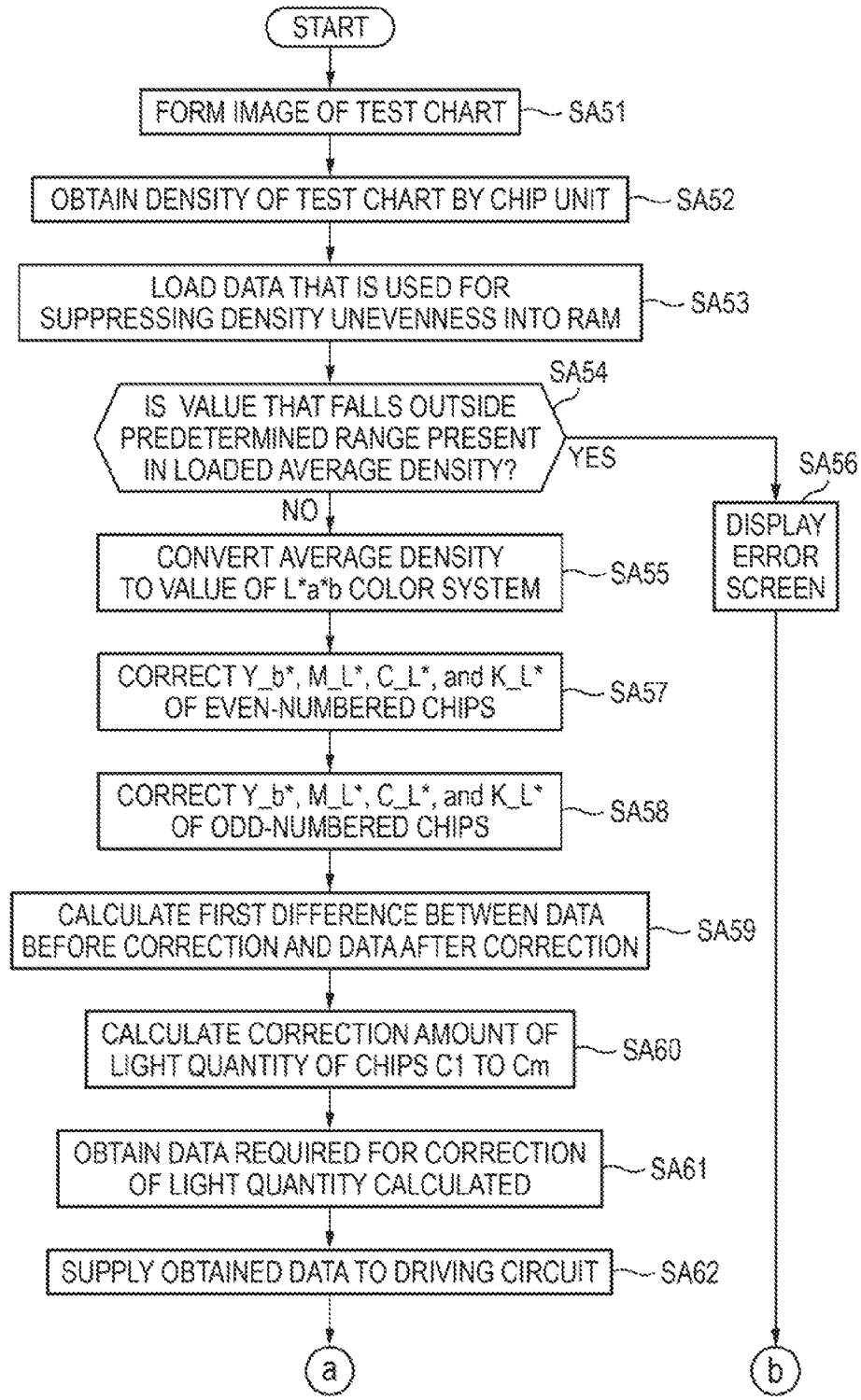
FIG. 11 is a flowchart illustrating a flow of processing performed by the control unit 51.
Figure 12:
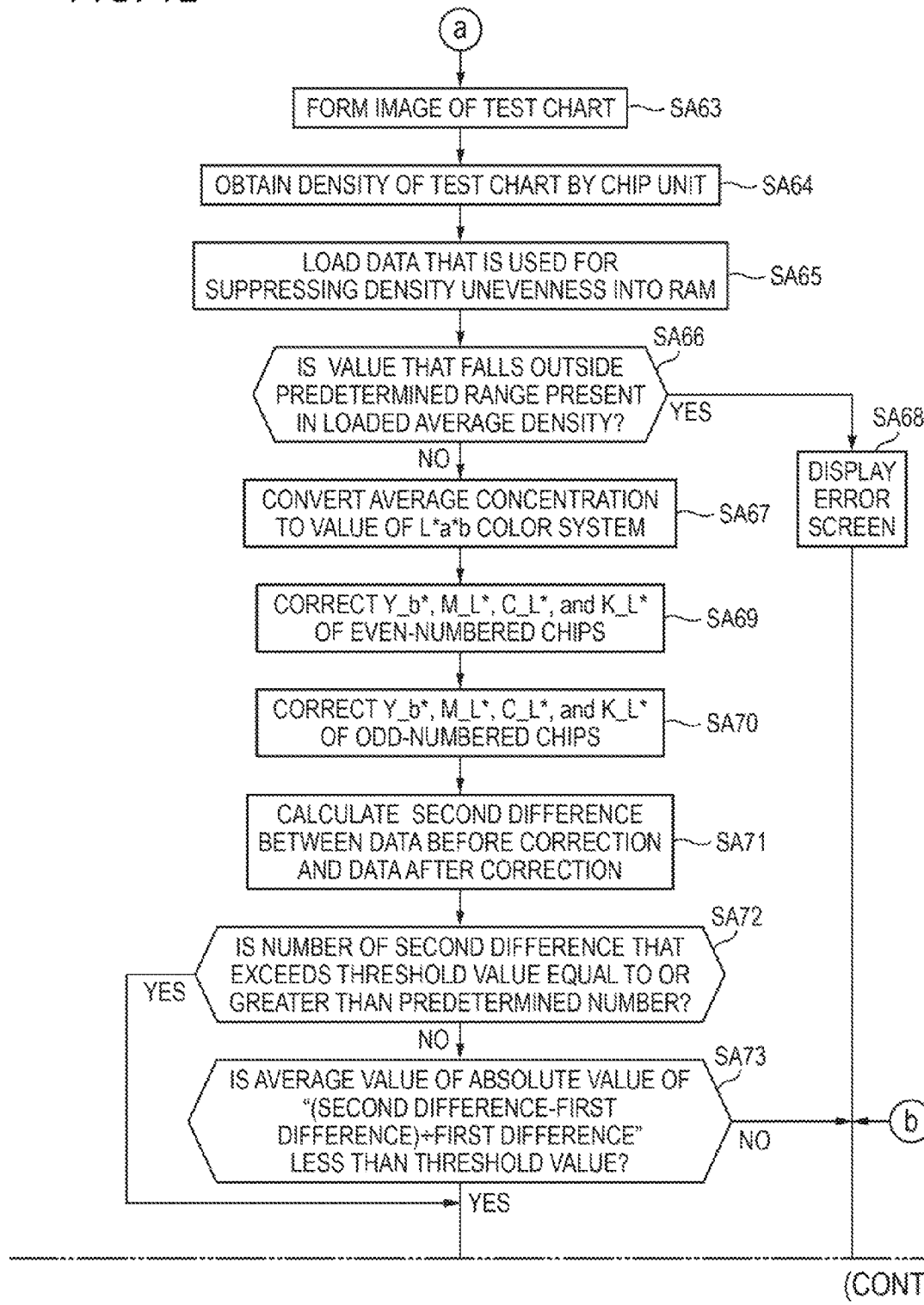
FIG. 12 is a flowchart illustrating the flow of processing performed by the control unit 51.
Figure 12:
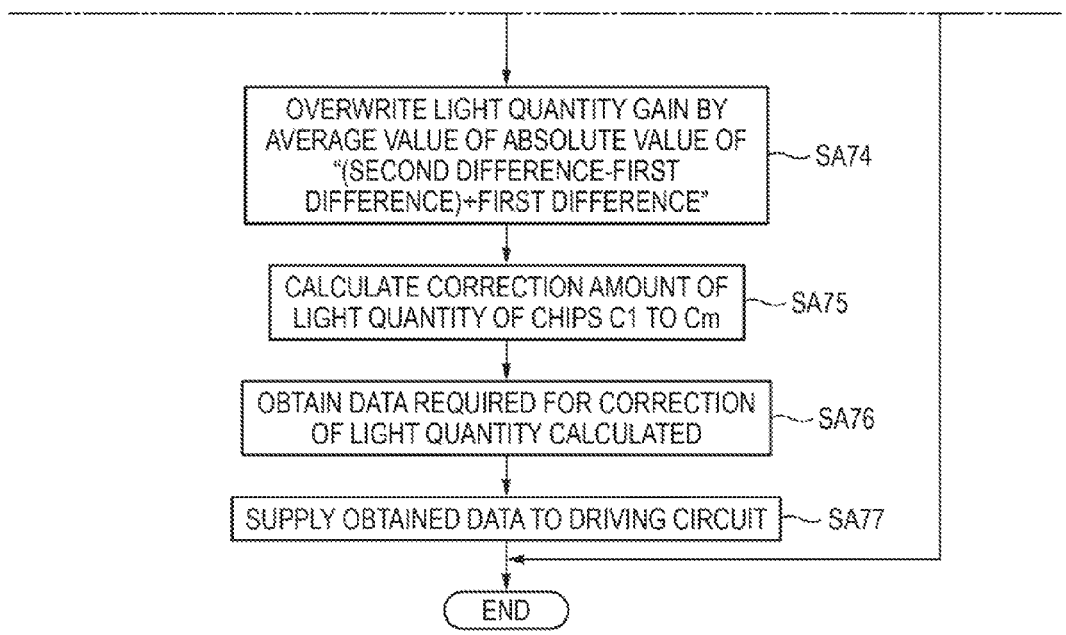

FIGS. 11 and 12 are flowcharts illustrating a flow of processing performed by the control unit 51 for suppressing the density unevenness of the image formed on the paper sheet. An example of the operation performed by the image forming apparatus for suppressing the density unevenness of the image formed on the paper sheet will be described by using FIGS. 11 and 12.

First, when a user of the image forming apparatus performs the operation of indicating the correction of the density unevenness of the toner image in the operation unit 15, the control unit 51 forms the image of the test chart on the paper sheet by controlling each unit (step SA51). Specifically, the control unit 51 supplies the image data of the test chart determined in advance to the image processing unit 12. The image processing unit 12 generates the image data of each color of Y, M, C, and K in accordance with the supplied image data. The image processing unit 12 supplies the image data of Y to the image forming engine 21Y, and supplies the image data of M to the image forming engine 21M. In addition, the image processing unit 12 supplies the image data of C to the image forming engine 21C, and supplies the image data of K to the image forming engine 21K. When the image data is supplied to the image forming engine 21Y, the image forming engine 21M, the image forming engine 21C, and the image forming engine 21K, the image forming unit 13 transfers the toner image that corresponds to the supplied image to the paper sheet, fixes the toner image to the paper sheet, and discharges the paper sheet to which the toner image is fixed from the image forming apparatus 1. Here, the test chart formed on the paper sheet by the image forming apparatus of the second embodiment is similar to the test chart formed on the paper sheet by the image forming apparatus 1 of the first embodiment (FIG. 5).

When the paper sheet on which the test chart is formed is discharged from the image forming apparatus 1, the user of the image forming apparatus sets the discharged paper sheet on which the test chart is formed on the scanning unit 14, and operate the operation unit 15 to give instructions of reading of the test chart. In response to this operation, the control unit 51 reads the test chart by controlling the scanning unit 14, and obtains the density of the test chart by the chip C unit (step SA52).

Specifically, when the scanning unit 14 reads the test chart, the image data that expresses the read test chart is supplied to the control unit 51. The image data is a bitmap format, and each pixel has the information on the density based on the RGB color model. Here, as illustrated in FIG. 6, regions A1 to Am illustrated by dotted lines are images obtained by the exposure of the chips C1 to Cm. When the image data is supplied, the control unit 51 (density specification unit 511) calculates the density of each test image by the chip C unit. For example, the control unit 51 calculates an average value of the density of R (red), an average value of the density of G (green), and an average value of the density of B (blue), in the region A1 that corresponds to the chip C1. In addition, the control unit 51 also calculates an average value of the density of each color of RGB in the regions A2 to Am of the test image CY. In addition, the control unit 51 also calculates an average value of the density of each color of RGB in the regions A1 to Am, with respect to the test image CM, the test image CC, and the test image CK.

Next, the control unit 51 (density specification unit 511) loads the data that is used for suppressing the density unevenness of the image formed on the paper sheet into the RAM (step SA53). The data loaded into the RAM by the processing of step SA53 is similar to the data loaded into the RAM by the processing of step SA3 of the first embodiment (FIG. 7).

When finishing the processing of step SA53, the control unit 51 (density specification unit 511) determines whether or not a value that falls outside a predetermined range in the average density loaded into the RAM is present (step SA54). For example, a dust image may be included in the image data generated by the scanning unit 14 when dust adheres onto the read test chart or when dust adheres to the scanning unit 14. In such case, in a part where the dust image is present, the density becomes larger than that in other parts, and the average density falls outside the predetermined range. If a value that falls outside the predetermined range in the average density loaded into the RAM is present (YES in step SA54), the control unit 51 controls the operation unit 15 so that an error screen that notifies that there is an abnormality in the scanning result of the test chart is displayed on a touch panel of the operation unit 15 (step SA56).

Meanwhile, the control unit 51 (density specification unit 511) converts the value of the average density to a value of the color model of L*a*b* (step SA55) if a value that falls outside the range determined in advance in the average density loaded into the RAM is not present (NO in step SA54). Here, the control unit 51 converts the value of the average densities Y_B[1] to Y_B[m] to a value of b*, and stores the obtained b* as Y_b*[1] to Y_b*[m]. In addition, the control unit 51 converts the value of the average densities M_G[1] to M_G[m] to a value of L*, and stores the obtained value of L* as M_L*[1] to M_L*[m]. In addition, the control unit 51 converts the value of the average densities C_R[1] to C_R[m] to a value of L*, and stores the obtained value of L* as C_L*[1] to C_L*[m]. In addition, the control unit 51 converts the value of the average densities K_G[1] to K_G[m] to a value of L*, and stores the obtained value of L* as K_L*[1] to K_L*[m]. As a method of converting the value of the average density to the value of the color system of L*a*b*, for example, a conversion table that converts the density value of the RGB color model to the value of the color system of L*a*b* is stored in the storage unit 17, and converts the value by using the conversion table.

When finishing the processing of step SA55, the control unit 51 (correction amount specification unit 512) corrects the values of Y_b*, M_L*, C_L*, and K_L* related to the even-numbered chips (step SA57). Specifically, first, the values of Y_b*[1] to Y_b*[m], M_L*[1] to M_L*[m], C_L*[1] to C_L*[m], and K_L*[1] to K_L*[m] related to the chips C1 to Cm are copied to the RAM as the Y_b*[1] to Y_b*[m] before the correction, M_L*[1] to M_L*[m] before the correction, C_L*[1] to C_L*[m] before the correction, and K_L*[1] to K_L*[m] before the correction. Next, the control unit 51 corrects values of Y_b*, M_L*, C_L*, and K_L* related to the even-numbered chips by the following formulas (9) to (12).

$$Y\_b^*[i] = (Y\_b^*[i+1] - Y\_b^*[i-1]) \div 2 + Y\_b^*[i-1] \quad (9)$$

$$M\_L^*[i] = (M\_L^*[i+1] - M\_L^*[i-1]) \div 2 + M\_L^*[i-1] \quad (10)$$

$$C\_L^*[i] = (C\_L^*[i+1] - C\_L^*[i-1]) \div 2 + C\_L^*[i-1] \quad (11)$$

$$K\_L^*[i] = (K\_L^*[i+1] - K\_L^*[i-1]) \div 2 + K\_L^*[i-1] \quad (12)$$

In step SA57, the control unit 51 sets the initial value of i as 2, increases the value of i by increments of 2, and finishes the correction related to the even-numbered chip when the value of i exceeds m−2. An operation of correction in step SA57 is similar to the operation of the correction in step SA7 of the first embodiment.

When finishing the processing of step SA57, the control unit 51 (correction amount specification unit 512) corrects the values of Y_b*, M_L*, C_L*, and K_L* related to the odd-numbered chips (step SA58). Specifically, in the above-described formulas (9) to (12), the control unit 51 sets the initial value of i as 3, increases the value of I by the increments of 2, and finishes the correction related to the odd-numbered chips when the value of i exceeds m that is the number of chips C.

When finishing the processing of step SA57 and step SA58, a difference between the values of Y_b*, M_L*, C_L*, and K_L* related to each chip C and the values of Y_b*, M_L*, C_L*, and K_L* related to the adjacent chips C in the main scanning direction, is corrected to be small.

When finishing the processing of step SA58, the control unit 51 (correction amount specification unit 512) calculates a difference between the values of Y_b*[1] to Y_b*[m], M_L*[1] to M_L*[m], C_L*[1] to C_L*[m], and K_L*[1] to K_L*[m] after the correction (target density) and the values of Y_b*[1] to Y_b*[m] before the correction, M_L* [1] to M_L*[m] before the correction, C_L*[1] to C_L*[m] before the correction, and K_L*[1] to K_L*[m] before the correction (step SA59). Specifically, the control unit 51 acquires the difference between Y_b*[1] to Y_b*[m] after the correction and Y_b*[1] to Y_b*[m] before the correction, and stores the acquired difference as ΔY_b*[1] to ΔY_b*[m] in the RAM. In addition, the control unit 51 acquires the difference between M_L*[1] to M_L*[m] after the correction and M_L*[1] to M_L*[$_m$] before the correction, and stores the acquired difference as ΔM_L*[1] to ΔM_L*[m] in the RAM. In addition, the control unit 51 acquires the difference between C_L*[1] to C_L*[m] after the correction and C_L*[1] to C_L*[m] before the correction, and stores the acquired difference as ΔC_L*[1] to ΔC_L*[m] in the RAM. In addition, the control unit 51 acquires the difference between K_L*[1] to K_L*[m] after the correction and K_L*[1] to K_L*[m] before the correction, and stores the acquired difference as ΔK_L*[1] to ΔK_L*[m] in the RAM. For example, the control unit 51 stores the difference between Y_b*[1] after the correction and Y_b*[1] before the correction as ΔY_b*[1] in the RAM.

In addition, the control unit 51 copies ΔY_b*[1] to ΔY_b*[m], ΔM_L*[1] to ΔM_L*[m], ΔC_L*[1] to ΔC_L* [m], and ΔK_L*[1] to ΔK_L*[m], and stores first ΔY_b*[1] to first ΔY_b*[m], first ΔM_L*[1] to first ΔM_L*[m], first ΔC_L*[1] to first ΔC_L*[m], and first ΔK_L*[1] to first ΔK_L*[m] in the RAM. In addition, in the following description, for convenience, the first ΔM_L*[1] to first ΔM_L*[m], the first ΔC_L*[1] to first ΔC_L*[m], and first the ΔK_L*[1] to first ΔK_L*[m] may be called as a first difference.

When finishing the processing of step SA59, the control unit 51 (correction amount specification unit 512) calculates the correction amount of the light quantity of the light output by the chips C1 to Cm of the exposure device 33 (step SA60).

Specifically, Y_Δlight quantities[1] to [m] that expresses the correction amount of the light quantity of the light output by the chips C1 to Cm of the exposure device 33Y, is calculated by using the following formula (13).

$$Y\_\Delta\text{light quantity}[i]=(\Delta Y\_b^*[i] \div Y\_\text{light quantity sensitivity}) \times (Y\_\text{light quantity gain} \div 100) \quad (13)$$

The control unit 51 sets the initial value of i as 1, increases the value of i by increments of 1, and finishes the calculation of Y_Δlight quantity [i] when the value of i exceeds m.

Here, the Y_light quantity sensitivity is a coefficient that corresponds to the light sensitivity of the photosensitive drum 31Y, and is stored in the storage unit 17. The Y_light quantity sensitivity expresses how much the value of b* of yellow changes when changing the light quantity only by an amount (for example, 1% of the light quantity that can be output) determined in advance. In addition, the light sensitivity of the photosensitive drum 31 varies in accordance with the film thickness of the photosensitive drum 31. For this reason, in the embodiment, as illustrated in FIG. 9, the table that stores the Y_light quantity sensitivity that corresponds to the film thickness of the photosensitive drum 31Y is stored in the storage unit 17, and the control unit 51 performs the calculation of Y_Δlight quantity [i] by obtaining the Y_light quantity sensitivity that corresponds to the film thickness of the photosensitive drum 31Y from the table.

In other words, the control unit 51 selects a method that corresponds to a state of the film thickness and includes a plurality of methods as a specification method of Y_Δlight quantity [i] in accordance with the film thickness (a state of image forming process) of the photosensitive drum 31Y, and performs specification of Y_Δlight quantity [i] by the selected method.

The Y_light quantity gain is a coefficient that adjusts the correction amount of the light quantity of the exposure device 33Y, and is stored in the storage unit 17. The value that is determined in advance during the manufacturing the image forming apparatus is stored in the storage unit 17 as the Y_light quantity gain.

In addition, the control unit 51 calculates M_Δlight quantities[1] to [m] that expresses the correction amount of the light quantity of the light output by the chips C1 to Cm of the exposure device 33M by using the following formula (14).

$$M\_\Delta\text{light quantity}[i]=(\Delta M\_L^*[i] \div M\_\text{light quantity sensitivity}) \times (M\_\text{light quantity gain} \div 100) \quad (14)$$

The control unit 51 sets the initial value of I as 1, increases the value of i by increments of 1, and finishes the calculation of M_Δlight quantity [i] when the value of i exceeds m.

Here, the M_light quantity sensitivity is a coefficient that corresponds to the light sensitivity of the photosensitive drum 31M, and is stored in the storage unit 17. The M_light quantity sensitivity expresses how much the value of L* of magenta changes when changing the light quantity only by an amount (for example, 1% of the light quantity that can be output) determined in advance. As illustrated in FIG. 9, the value of the M_light quantity sensitivity that corresponds to the film thickness of the photosensitive drum 31M is also stored in the table similar to the Y_light quantity sensitivity, and the control unit 51 performs the calculation of M_Δlight quantity [i] by obtaining the M_light quantity sensitivity that corresponds to the film thickness of the photosensitive drum 31M, from the table.

In other words, the control unit 51 selects a method that corresponds to a state of the film thickness and includes plural methods as a specification method of M_Δlight quantity [i] in accordance with the film thickness (a state of image forming process) of the photosensitive drum 31M, and performs specification of M_Δlight quantity [i] by the selected method.

The M_light quantity gain is a coefficient that adjusts the correction amount of the light quantity of the exposure device 33M, and is stored in the storage unit 17. The value that is determined in advance during the manufacturing the image forming apparatus is stored in the storage unit 17 as the M_light quantity gain.

In addition, the control unit 51 calculates C_Δlight quantities[1] to [m] that expresses the correction amount of the light quantity of the light output by the chips C1 to Cm of the exposure device 33C by using the following formula (15).

$$C\_\Delta\text{light quantity}[i]=(\Delta C\_L^*[i] \div C\_\text{light quantity sensitivity}) \times (C\_\text{light quantity gain} \div 100) \quad (15)$$

The control unit 51 sets the initial value of i as 1, increases the value of i by increments of 1, and finishes the calculation of C_Δlight quantity [i] when the value of i exceeds m.

Here, the C_light quantity sensitivity is a coefficient that corresponds to the light sensitivity of the photosensitive drum 31C, and is stored in the storage unit 17. The C_light quantity sensitivity expresses how much the value of L* of cyan changes when changing the light quantity only by an amount (for example, 1%) determined in advance. As illustrated in FIG. 9, the value of the C_light quantity sensitivity that corresponds to the film thickness of the photosensitive drum 31C is also stored in the table similar to the Y_light quantity sensitivity, and the control unit 51 performs the calculation of C_Δlight quantity [i] by obtaining the C_light quantity sensitivity that corresponds to the film thickness of the photosensitive drum 31C, from the table.

In other words, the control unit 51 selects a method that corresponds to a state of the film thickness and includes a plurality of methods as a specification method of C_Δlight quantity [i] in accordance with the film thickness (a state of image forming process) of the photosensitive drum 31C, and performs specification of C_Δlight quantity [i] by the selected method.

The C_light quantity gain is a coefficient that adjusts the correction amount of the light quantity of the exposure device 33C, and is stored in the storage unit 17. The value that is determined in advance during the manufacturing the image forming apparatus is stored in the storage unit 17 as the C_light quantity gain.

In addition, the control unit 51 calculates K_Δlight quantities[1] to [m] that expresses the correction amount of the light quantity of the light output by the chips C1 to Cm of the exposure device 33K by using the following formula (16).

$$K\_\Delta\text{light quantity}[i]=(\Delta K\_L^*[i] \div K\_\text{light quantity sensitivity}) \times (K\_\text{light quantity gain} \div 100) \quad (16)$$

The control unit 51 sets the initial value of i as 1, increases the value of i by increments of 1, and finishes the calculation of K_Δlight quantity [i] when the value of i exceeds m.

Here, the K_light quantity sensitivity is a coefficient that corresponds to the light sensitivity of the photosensitive drum 31K, and is stored in the storage unit 17. The K_light quantity sensitivity expresses how much the value of L* of black changes when changing the light quantity only by an amount (for example, 1% of the light quantity that can be output) determined in advance. As illustrated in FIG. 9, the value of the K_light quantity sensitivity that corresponds to the film thickness of the photosensitive drum 31K is also stored in the table similar to the Y_light quantity sensitivity, and the control unit 51 performs the calculation of K_Δlight quantity [i] by obtaining the K_light quantity sensitivity that corresponds to the film thickness of the photosensitive drum 31K from the table.

In other words, the control unit 51 selects a method that corresponds to a state of the film thickness and includes a plurality of methods as a specification method of K_Δlight quantity [i] in accordance with the film thickness (a state of image forming process) of the photosensitive drum 31K, and performs specification of K_Δlight quantity [i] by the selected method.

The K_light quantity gain is a coefficient that adjusts the correction amount of the light quantity of the exposure device 33K, and is stored in the storage unit 17. The value that is determined in advance during the manufacturing the image forming apparatus is stored in the storage unit 17 as the K_light quantity gain.

When finishing the processing of step SA60, the control unit 51 (correction unit 513) obtains the data supplied to the driving circuit 330 for changing the light quantities of the chips C1 to Cm only by the correction amount calculated in step SA60 (step SA61).

Specifically, in the storage unit 17, the tables that associate the correction amount of the light quantity and the data supplied to the driving circuit 330 for changing the light quantity only by the correction amount with each other is stored. The control unit 51 obtains the corresponding data from the table for each calculated Y_Δlight quantities[1] to [m] and considers the data as correction data Ydata[1] to [m]. In addition, the control unit 51 obtains the corresponding data from the table for each calculated M_Δlight quantities[1] to [m] and considers the data as correction data Mdata[1] to [m]. In addition, the control unit 51 obtains the corresponding data from the table for each calculated C_Δlight quantities[1] to [m] and considers the data as correction data Cdata[1] to [m]. In addition, the control unit 51 obtains the corresponding data from the table for each calculated K_Δlight quantities[1] to [m] and considers the data as correction data Kdata[1] to [m]. In other words, the control unit 51 obtains the correction data for correcting the light quantity with respect to each of the chips C1 to Cm of the exposure device 33Y, the exposure device 33M, the exposure device 33C, and the exposure device 33K.

When finishing the processing of step SA61, the control unit 51 (correction unit 513) supplies the correction data obtained in step SA61 to the driving circuit 330 of the exposure device 33 (step SA62). Specifically, the control unit 51 supplies the correction data Ydata[1] to [m] to the driving circuit 330Y, and supplies the correction data Mdata[1] to [m] to the driving circuit 330M. In addition, the control unit 51 supplies the correction data Cdata[1] to [m] to the driving circuit 330C, and supplies the correction data Kdata[1] to [m] to the driving circuit 330K. Each driving circuit 330 corrects the light quantity of the light output by the chips C1 to Cm in accordance with the supplied correction data.

Next, the control unit 51 forms the image of the test chart similar to step SA51 by controlling each unit (step SA63). When the test chart is discharged from the image forming apparatus, the user of the image forming apparatus sets the discharged test chart to the scanning unit 14, and performs an operation of indicating the reading of the test chart in the operation unit 15. When the operation is performed, the control unit 51 reads the test chart by controlling the scanning unit 14, and obtains the density of the test chart by the chip C unit similar to step SA52 (step SA64). When finishing the processing of step SA64, the control unit 51 (density specification unit 511) loads the data into the RAM similar to step SA53 by using the data for suppressing the density unevenness of the image formed on the paper sheet (step SA65).

When finishing the processing of step SA65, the control unit 51 (density specification unit 511) determines whether or not a value that falls outside a predetermined range in the average density loaded into the RAM is present (step SA66). If a value that falls outside the predetermined range in the average density loaded into the RAM is present (YES in step SA66), the control unit 51 controls the operation unit 15 so that an error screen that notifies that there is an abnormality in the scanning result of the test chart is displayed on a touch panel of the operation unit 15 (step SA68).

Meanwhile, the control unit 51 (density specification unit 511) converts the value of the average density to a value of the color system of L*a*b* (step SA67) similar to step SSA55 if a value that falls outside the predetermined range in the average density loaded into the RAM is not present (NO in step SA66). When finishing the processing of step SA67, the control unit 51 (correction amount specification unit 512) corrects the values of Y_b*, M_L*, C_L*, and K_L* related to the even-numbered chip similar to step SA57 (step SA69), and then, corrects the values of Y_b*, M_L*, C_L*, and K_L* related to the odd-numbered chip similar to step SA58 (step SA70).

When finishing the processing of step SA70, the control unit 51 (correction amount specification unit 512) calculates the difference between the values of Y_b*[1] to Y_b*[m], M_L*[1] to M_L*[m], C_L*[1] to C_L*[m], and K_L*[1] to K_L*[m] after the correction (target density), and the values of Y_b*[1] to Y_b*[m] before the correction, M_L*[1] to M_L*[m] before the correction, C_L*[1] to C_L*[m] before the correction, and K_L*[1] to K_L*[m] before the correction, and similar to step SA59, acquires ΔY_b*[1] to ΔY_b*[m], ΔM_L*[1] to ΔM_L*[m], ΔC_L*[1] to ΔC_L*[m], and ΔK_L*[1] to ΔK_L*[m] (step SA71).

In addition, in step SA71, the control unit 51 copies the acquired ΔY_b*[1] to ΔY_b*[m], ΔM_L*[1] to ΔM_L*[m], ΔC_L*[1] to ΔC_L*[m], and ΔK_L*[1] to ΔK_L*[m], and stores second ΔY_b*[1] to second ΔY_b*[m], second ΔM_L*[1] to second ΔM_L*[m], second ΔC_L*[1] to second ΔC_L*[m], and second ΔK_L*[1] to second ΔK_L*[m] in the RAM. In addition, in the following description, for convenience, the second ΔY_b*[1] to second ΔY_b*[m], the second ΔM_L*[1] to second ΔM_L*[m], the second ΔC_L*[1] to second ΔC_L*[m], and second the ΔK_L*[1] to second ΔK_L*[m] may be called as a second difference.

Next, the control unit 51 determines whether or not the number of differences that exceed a threshold value determined in advance is less than the number determined in advance in the plurality of differences calculated in step SA71 (step SA72). In the embodiment, the threshold value is a value that corresponds to a visible difference in the color system of L*a*b* when viewed by a human being, but may be other values.

If the number of the differences that exceed the threshold value is less than the number determined in advance in the plurality of differences calculated in step SA71 (NO in step SA72), the control unit 51 determines whether the average value of absolute values of "(second difference−first difference)÷first difference" is less than the threshold value (0.5 in the embodiment) determined in advance (step SA73).

Specifically, the control unit 51 sets the initial value of i as 1 and calculates the absolute values by increasing the value of i by increments of 1 by formulas "|(second ΔY_b*[i]−first ΔY_b*[i])÷first ΔY_b*[i]|, "|(second ΔM_L*[i]−first ΔM_L*[i])÷first ΔM_L*[i]|, |(second ΔC_L*[i]−first ΔC_L*[i])÷first ΔC_L*[i]|, |(second ΔK_L*[i]−first ΔK_L*[i])÷first ΔK_L*[i]|. Next, the control unit 51 calculates the average value of the calculated absolute values, and finishes the correction processing of the density unevenness if the average value is not less than 0.5 (NO in step SA73).

Meanwhile, when YES is determined in step SA72 or in step SA73, the control unit 51 (change unit 514) overwrites the Y_light quantity gain, the M_light quantity gain, the C_light quantity gain, and the K_light quantity gain that are stored in the storage unit 17 by an average value of the absolute values calculated in step SA73 (step SA74).

When finishing the processing of step SA74, the control unit 51 (correction amount specification unit 512) calculates the correction amount of the light quantity of the light output by the chips C1 to Cm of the exposure device 33 similar to step SA60 (step SA75). Here, when calculating the correction amount, the correction amount is calculated by using the overwritten Y_light quantity gain, M_light quantity gain, C_light quantity gain, and K_light quantity gain.

When finishing the processing of step SA75, the control unit 51 (correction unit 513) obtains the data supplied to the driving circuit 330 for changing the light quantities of the chips C1 to Cm only by the correction amount calculated in step SA75 similar to step SA61 (step SA76).

When finishing the processing of step SA76, the control unit 51 (correction unit 513) supplies the correction data obtained in step SA76, to the driving circuit 330 of the exposure device 33 similar to step SA62 (step SA77).

MODIFICATION EXAMPLE

Above, the embodiments of the present invention are described, but the present invention is not limited to the above-described embodiments, and can be realized by other various aspects. For example, the present invention may be realized by deforming the above-described embodiments as follows. In addition, the above-described embodiments and the following modification examples may be combined with each other.

In the above-described embodiments, both the correction of the values of Y_b*, M_L*, C_L*, and K_L* related to the even-numbered chips, and the correction of the values of Y_b*, M_L*, C_L*, and K_L* related to the odd-numbered chips are performed, but the invention is not limited to this configuration. For example, a configuration in which the correction of the values of Y_b*, M_L*, C_L*, and K_L* related to the even-numbered chips is performed, and the correction of the values of Y_b*, M_L*, C_L*, and K_L* related to the odd-numbered chips is not performed, may be employed. In addition, a configuration in which the correction of the values of Y_b*, M_L*, C_L*, and K_L* related to the odd-numbered chips is performed, and the correction of the values of Y_b*, M_L*, C_L*, and K_L* related to the even-numbered chips is not performed, may be employed.

In the above-described embodiments, the correction of the values of Y_b*, M_L*, C_L*, and K_L* related to the odd-numbered chips is performed after performing the correction of the values of Y_b*, M_L*, C_L*, and K_L* related to the odd-numbered chips is performed. However, the correction of the values of Y_b*, M_L*, C_L*, and K_L* related to the even-numbered chips may be performed after performing the correction of the values of Y_b*, M_L*, C_L*, and K_L* related to the odd-numbered chips.

In the above-described embodiments, when correcting the values of Y_b*, M_L*, C_L*, and K_L* related to the chips C in step SA7, step SA8, step SA57, step SA58, step SA69, and step SA70, the values based on the values of Y_b*, M_L*, C_L*, and K_L* of the adjacent chips C is performed. However, the values may be corrected based on the values of Y_b*, M_L*, C_L*, and K_L* of the chips C in the range determined in advance from the chip considered as a corrected chip, and for example, the values of Y_b*, M_L*, C_L*, and K_L* may be corrected by the following formulas (17) to (20).

$$Y\_b^*[i]=(Y\_b^*[i+2]-Y\_b^*[i-2])\div 2+Y\_b^*[i-2] \quad (17)$$

$$M\_L^*[i]=(M\_L^*[i+2]-M\_L^*[i-2])\div 2+M\_L^*[i-2] \quad (18)$$

$$C\_L^*[i]=(C\_L^*[i+2]-C\_L^*[i-2])\div 2+C\_L^*[i-2] \quad (19)$$

$$K\_L^*[i]=(K\_L^*[i+2]-K\_L^*[i-2])\div 2+K\_L^*[i-2] \quad (20)$$

In the above-described embodiments, the values of Y_b*, M_L*, C_L*, and K_L* are corrected by linearization approximation by the formulas (1) to (4) and (9) to (12). However, the method of correcting the values of Y_b*, M_L*, C_L*, and K_L* is not limited to the linearization approximation. For example, the values of Y_b*, M_L*, C_L*, and K_L* may be corrected by polynomial approximation.

In the above-described embodiments, the image forming apparatus has a configuration in which dry toner is used, but a configuration in which liquid toner is used, that is, a configuration in which liquid developing is performed, may be employed. In addition, in the above-described embodiments, the image forming apparatus is an apparatus that forms an image on a paper sheet by electro-photographic method, but the invention is not limited to the electro-photographic method. For example, in a single-pass type ink jet printer provided with a plurality of print heads, the correction amount of density of the image formed by the odd-numbered print heads in the main scanning direction, and the correction amount of the density of the image formed by the even-numbered print head, may be acquired in accordance with the result of reading of the test chart, and the driving of the print heads may be controlled in accordance with the acquired correction amount.

In the above-described embodiments, in steps SA10, SA60, and SA75, the Y_light quantity sensitivity, the M_light quantity sensitivity, C_light quantity sensitivity, and the K_light quantity sensitivity are considered as values that correspond to the film thickness of the photosensitive drum 31, but the invention is not limited to this configuration.

For example, a configuration in which the values of the Y_light quantity sensitivity, the M_light quantity sensitivity, C_light quantity sensitivity, and the K_light quantity sensitivity that correspond to the film thickness does not change, and a fixed value determined in advance is used, may be employed.

In addition, in the present invention, a configuration in which the light quantity (reference light quantity) that becomes a reference is set, the light quantity that becomes the reference is selected in accordance with the state (for example, the temperature in the image forming unit 13) of the image forming unit 13, and the correction of the light quantity is performed focusing on the selected light quantity, may be employed. In this case, a configuration in which the values of the Y_light quantity sensitivity, the M_light quantity sensitivity, the C_light quantity sensitivity, and the K_light quantity sensitivity changes in accordance with the selected light quantity, may be employed.

In addition, a configuration in which the values of the Y_light quantity sensitivity, the M_light quantity sensitivity, the C_light quantity sensitivity, and the K_light quantity sensitivity changes in accordance with a bright potential or a dark potential of the photosensitive drum 31, and a bypass voltage of the developer 34, may be employed.

In addition, a configuration in which the values of the Y_light quantity sensitivity, the M_light quantity sensitivity, the C_light quantity sensitivity, and the K_light quantity sensitivity changes in accordance with a state (how much % of the toner enters into the developer 34) of the toner in the developer 34, may be employed.

In the above-described embodiments, the values of the Y_light quantity sensitivity, the M_light quantity sensitivity, the C_light quantity sensitivity, and the K_light quantity sensitivity are obtained by using the table, but the invention is not limited thereto. For example, in the configuration in which the values of the Y_light quantity sensitivity, the M_light quantity sensitivity, the C_light quantity sensitivity, and the K_light quantity sensitivity changes in accordance with the film thickness of the photosensitive drum 31, a configuration in which the values of the Y_light quantity sensitivity, the M_light quantity sensitivity, the C_light quantity sensitivity, and the K_light quantity sensitivity are obtained by multiplying the coefficient that corresponds to the film thickness with respect to the initial value determined in advance, may be employed.

In addition, in the present invention, the formulas for acquiring the values of the Y_light quantity sensitivity, the M_light quantity sensitivity, the C_light quantity sensitivity, and the K_light quantity sensitivity may be set in accordance with the state of the image forming unit 13, such as the reference light quantity of the light output by the chips C1 to Cm, the bright potential or the dark potential of the photosensitive drum 31, the bypass voltage of the developer 34, and a ratio of the toner in the developer 34, and the values of the Y_light quantity sensitivity, the M_light quantity sensitivity, the C_light quantity sensitivity, and the K_light quantity sensitivity may be obtained by selecting the formula that corresponds to parameters.

The foregoing description of the exemplary embodiments of the present invention has been provided for the purposes of illustration and description. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit in which a plurality of chips including a plurality of light emitting elements are arranged in a main scanning direction, the image forming unit forming an image on a recording medium by developing an electrostatic latent image formed on an image holder, the electrostatic latent image formed on the image holder by exposing the image holder to light from the light emitting elements;
   a fixing unit that fixes the image formed on the recording medium;
   a reading unit that reads the image fixed on the recording medium by the fixing unit;
   a density specification unit that specifies a density of a region in the image read by the reading unit for each of the chips, the region corresponding to each of the chips;
   a correction amount specification unit that specifies a correction amount of light quantity of light emitted from the chip based on an approximate value obtained by approximating the density specified by the density specification unit, the density of a region corresponding to a chip arranged in a predetermined range from a chip for which the correction amount specification unit specifies the correction amount of the light quantity; and
   a correction unit that corrects the light quantity of the light emitted from the chip in accordance with the correction amount specified by the correction amount specification unit,
   wherein the correction amount specification unit specifies the correction amount of the light quantity of the light emitted from the chip based on the approximate value, the approximate value being adjusted by using a coefficient; and the image forming apparatus further comprises a change unit that changes the coefficient based on the density currently specified by the density specification unit, and the density previously specified by the density specification unit.

2. The image forming apparatus according to claim 1, wherein the correction amount specification unit specifies a target density of the region corresponding to each of the chips based on the approximate value and calculates a difference between the density specified by the density specification unit and the target density to specify the correction amount of the light quantity of the light emitted from the chip, and the change unit changes the coefficient in a case where the difference currently calculated by the correction amount specification unit exceeds a predetermined threshold value.

3. The image forming apparatus according to claim 2, wherein the change unit changes the coefficient based on a difference between the difference previously calculated by the correction amount specification unit and the difference currently calculated by the correction amount specification unit.

4. An image forming apparatus comprising:

an image forming unit in which a plurality of chips including a plurality of light emitting elements are arranged in a main scanning direction, the image forming unit forming an image on a recording medium by developing an electrostatic latent image formed on an image holder, the electrostatic latent image formed on the image holder by exposing the image holder to light from the light emitting elements;

a fixing unit that fixes the image formed on the recording medium;

a reading unit that reads the image fixed on the recording medium by the fixing unit;

a density specification unit that specifies a density of a region in the image read by the reading unit for each of the chips, the region corresponding to each of the chips;

a correction amount specification unit that specifies a correction amount of light quantity of light emitted from the chip based on an approximate value obtained by approximating the density specified by the density specification unit, the density of a region corresponding to a chip arranged in a predetermined range from a chip for which the correction amount specification unit specifies the correction amount of the light quantity; and a correction unit that corrects the light quantity of the light emitted from the chip in accordance with the correction amount specified by the correction amount specification unit, wherein the correction amount specification unit specifies the correction amount of the light quantity of the light emitted from one of an odd-numbered chip and an even-numbered chip from one end in the main scanning direction after specifying the correction amount of the light quantity of the light emitted from other of the odd-numbered chip and the even-numbered chip.

5. The image forming apparatus according to claim 1, wherein the correction amount specification unit specifies the correction amount of the light quantity of light emitted from an odd-numbered chip from one end in the main scanning direction.

6. The image forming apparatus according to claim 1, wherein the correction amount specification unit specifies the correction amount of the light quantity of the light emitted from an even-numbered chip from one end in the main scanning direction.

7. An image forming apparatus comprising:

an image forming unit in which a plurality of chips including a plurality of light emitting elements are arranged in a main scanning direction, the image forming unit forming an image on a recording medium by developing an electrostatic latent image formed on an image holder, the electrostatic latent image formed on the image holder by exposing the image holder to light from the light emitting elements;

a fixing unit that fixes the image formed on the recording medium;

a reading unit that reads the image fixed on the recording medium by the fixing unit;

a density specification unit that specifies a density of a region in the image read by the reading unit for each of the chips, the region corresponding to each of the chips;

a correction amount specification unit that specifies a correction amount of light quantity of light emitted from the chip based on an approximate value obtained by approximating the density specified by the density specification unit, the density of a region corresponding to a chip arranged in a predetermined range from a chip for which the correction amount specification unit specifies the correction amount of the light quantity; and a correction unit that corrects the light quantity of the light emitted from the chip in accordance with the correction amount specified by the correction amount specification unit, wherein the correction amount specification unit specifies the correction amount by using a density of a region that corresponds to a chip adjacent to a chip for which the correction amount specification unit specifies the correction amount of the light quantity or the density of a region that corresponds to a chip that is arranged two chips away from a chip for which the correction amount specification unit specifies the correction amount of the light quantity.

8. The image forming apparatus according to claim 1, wherein the correction amount specification unit specifies the correction amount by using the density of a region that corresponds to a chip that is arranged two chips away from a chip for which the correction amount specification unit specifies the correction amount of the light quantity.

* * * * *